United States Patent [19]

Kuest et al.

[11] 4,143,592
[45] Mar. 13, 1979

[54] APPARATUS FOR FOOD DEHYDRATION AND RAISING BAKERY PRODUCTS DOUGHS

[76] Inventors: Johnnie Kuest; Elsie Kuest, both of P.O. Box 110, Filer, Id. 83328

[21] Appl. No.: 823,875

[22] Filed: Aug. 11, 1977

[51] Int. Cl.² ............................................. A23C 3/02
[52] U.S. Cl. ...................................... 99/483; 99/516
[58] Field of Search .............................. 99/473–476, 99/483–484, 516; 219/393; 34/90–91; 126/20, 281

[56] References Cited

U.S. PATENT DOCUMENTS

| | | | |
|---|---|---|---|
| 2,161,196 | 6/1939 | Prosser | 126/281 |
| 3,955,488 | 5/1976 | Wheeler | 99/483 |
| 4,065,857 | 1/1978 | Nelson | 99/476 |

FOREIGN PATENT DOCUMENTS 1119958  3/1955  France ........................................ 99/476

*Primary Examiner*—Leonard D. Christian
*Attorney, Agent, or Firm*—Frank J. Dykas

[57] ABSTRACT

The invention comprises a food dehydration and bakery product and bread dough raising appliance for household use. The appliance has a heating element within the dehydration and dough raising chamber and a temperature control unit capable of regulating temperature within both the dough raising and food dehydrating temperature ranges. The appliance, when dehydrating foodstuffs, utilizes a fixed volume, constant speed ventilation system wherein air enters the chamber through presized intake ports, is blown horizontally between the drying racks and exits through exhaust vents defined between a frontal access door and the appliance cabinet. The appliance, when used as a dough raiser, utilizes a dough raising shelf with an attached water trough which is positionable directly above the heating element for raising the relative humidity within the chamber.

3 Claims, 4 Drawing Figures

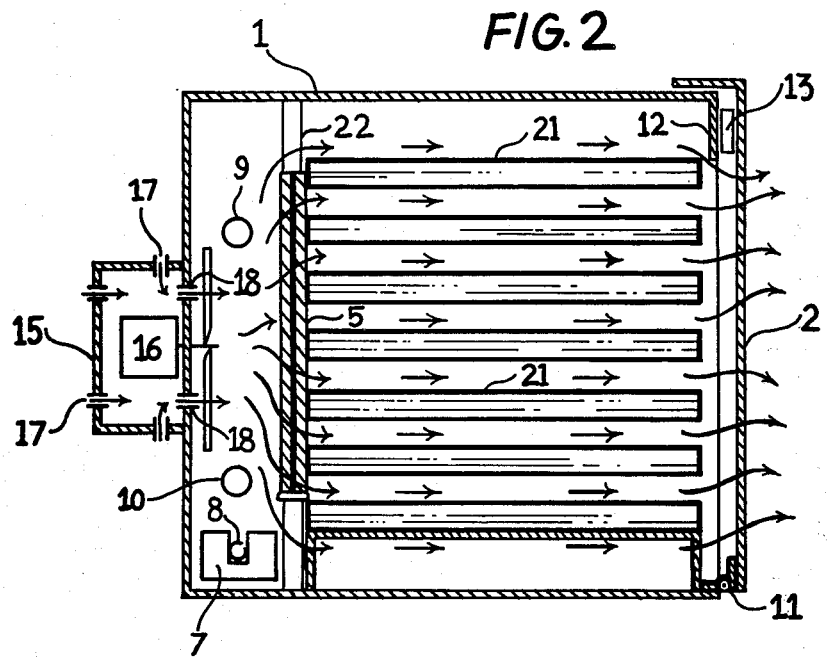
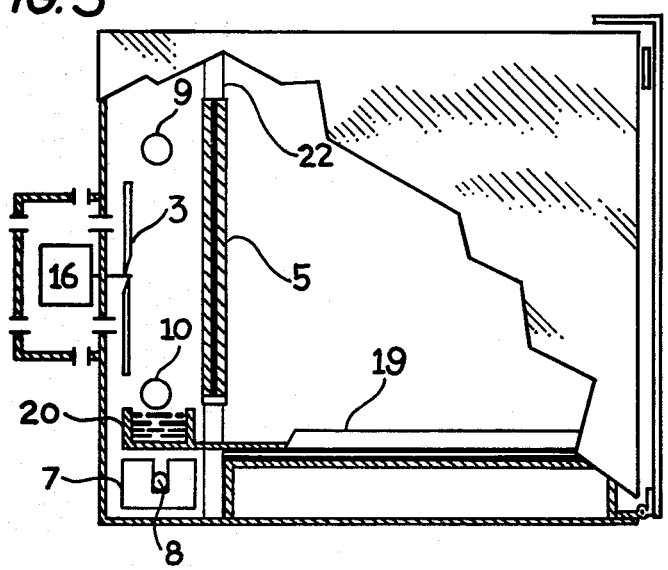

APPARATUS FOR FOOD DEHYDRATION AND RAISING BAKERY PRODUCTS DOUGHS

FIELD OF INVENTION

This invention relates to a household kitchen appliance which combines the functions of preserving foods by dehydration with the raising of bread doughs and other bakery products in a controlled environment.

BACKGROUND OF INVENTION

One of the oldest methods known to mankind for preserving foodstuffs, namely, fruits, vegetables, and meats is to dehydrate them to the point where microorganisms such as molds, bacterias and yeasts will not be able to reproduce in sufficient quantities to spoil the food for human consumption. Originally this was accomplished by means of placing a drying rack or table in the open air and sunshine. Indeed many such drying racks still exist along the beaches of Cape Cod which were used during colonial times for the dehydration of meats prior to their shipment to Europe.

The use of the sun for dehydration was at best a most unsatisfactory procedure since proper and optimum dehydration requires control of air flow, temperature and humidity. Additionally it is well known in the art that proper control of air flow, temperature and humidity will optimize retention of food coloring, flavoring, consistency and nutrient value.

In the past numerous food dehydrating apparatus have been developed. As a general rule all of these dehydrators have attempted to control humidity, which must be substantially below saturation, by means of a variable speed fan motor or a recirculation device of some sort. Additionally each of these devices has attempted to control dehydration temperature by preheating the air entering the dehydrator prior to its entry.

Additionally prior dehydrators have attempted to achieve uniform air flow past the numerous dehydration trays by means of either blowing the warm dry air vertically through the trays from bottom to top or horizontally between the trays by the use of numerous complicated air ducts, louvers and passageways such as those disclosed in Bills et al., U.S. Pat. No. 3,943,842.

If air ducts and/or adjustable louvers are used the result in an increase in costs of manufacture and usually a decrease in the drying capacity in relation to size and weight of the appliance.

In order to produce an economical, lighter and smaller dehydrator which would be better suited for household use, dehydrators were developed that did not utilize complicated ducts and baffling systems, but rather attempted to achieve uniform air flow by ducting the influent air into the dehydration chamber at the bottom and allowing it to blow or rise, through the various dehydration trays, normally constructed of screens or wire meshes, to the top where the effluent was either released to the atmosphere or recirculated to the influent chamber. While such dehydrators were more economical and lighter in weight, they cannot be used to dehydrate more than one type of food at the same time since cross flavoring will result. This results when air passing through one tray containing a particular food being dehydrated picks up certain flavoring elements which are then deposited upon food being dehydrated on a higher tray. Additionally vertical air flows often result in non-uniform dehydration rates with the resulting variations of consistency from one side of the dehydrated food to the other.

Bread and bakery product dough raising, when done commercially, often is accomplished through the use of a specially designed dough raising cabinet or other similar apparatus. These commercial devices are usually large and custom designed. Because of space requirements, costs, and the limited use to which a dough raising cabinet can be put, the household use of special dough raising cabinets has been limited.

Because of this, most household bakers rely upon the open air environment of the home and increased amounts of time to raise the bread dough. Usually the home baker will select the room with the most favorable conditions for dough raising and allow the bread to raise in a cloth covered pan for a number of hours prior to baking. The net result is that the home baker expends considerably more time, care and effort to produce bakery products than the commercial baker does.

In practice it has been found that the optimum environment for dough raising is an unventilated atmosphere with a temperature of 80° F. to 90° F. with a relative humidity in excess of 90%. While these conditions can be created during the summer months in most areas of the country, they cannot be achieved during the winter months or when home air conditioning is in use.

In effect, the environments for dehydrating foodstuffs and raising bakery product dough are mutually exclusive. When dehydrating foods, you are inhibiting the growth of yeasts, molds and bacteria, and when raising bakery product dough you are attempting to promote the growth of yeasts.

OBJECTS OF THE INVENTION

The principal object of this invention is to provide a multiple use, low cost home appliance which can be used for both dehydrating foods and raising bread dough.

Another object of this invention is to provide a food dehydrator of compact design and light weight for ease of storage and portability. A third object of this invention is to provide a food dehydrator and dough raiser of simple design to facilitate ease of operation and care.

A fourth object of this invention is to provide a food dehydrator which has a ventilation flow design which minimizes or eliminates cross food flavoring thereby allowing for simultaneous dehydration of different foods.

SUMMARY OF THE INVENTION

We achieve these objects by providing a ventilation system to the dehydration chamber which only provides a predetermined, constant flow of air from the rear of the dehydration unit across the dehydrating trays to exhaust ports defined by the frontal access door thereby eliminating virtually all special ducting and louvers. In order to further simplify and minimize the size of the dehydration unit no attempt is made to preheat the ventilation air prior to its entry into the dehydration chamber, but rather the heating elements are located within the dehydration chamber. Additionally this feature of the invention is essential to the conversion of the dehydrator from a low humidity, high temperature, controlled ventilation, dehydrating unit into a lower temperature, high humidity, bread raising cabinet.

Major reductions in the number of component parts, the weight of the appliance and its cost are accomplished through the utilization of a fixed volume, constant speed, flow through ventilation feature of this invention. By this design influent air passes through various intake ports into the motor casing at the rear of the dehydration unit and then into the dehydration chamber through presized openings behind the fan blade. The influent air is then heated by a resistance heater located at the bottom rear of the chamber and diffused by means of the fan passing the air through a diffuser screen throughout the dehydration chamber. The ventilated heated air then passes horizontally through the dehydration chamber between the drying racks to the front of the unit where it is exhausted through exhaust ports defined by the frontal access door and the sides of the dehydration chamber. The net result is the elimination of recirculation ducts, a preheating chamber, baffles both adjustable and fixed and specially designed exhaust ducting.

A special dough raising shelf and water trough, which is another feature of this invention, is provided with the appliance for use when the appliance is in the bread raising mode. When this feature of the invention is utilized, the dough raising shelf, which is designed to support the greater weight of several pounds of bread dough, is placed in the bottom level of the dehydration chamber so that the water trough is located directly and closely above the heating element.

Control of temperature within the unit is accomplished by means of a thermostat which can be adjusted from the 75° F. to 100° F. range necessary for dough raising up to 160° F. for food dehydration. A mode of operation selector switch is provided so that the fan will run when the unit is used for dehydrating foods and will be deactivated while still allowing for heater operation when the appliance is used for raising dough.

BRIEF DESCRIPTION OF THE ACCOMPANYING DRAWINGS

FIG. 2 is a transverse, vertical sectional view of the appliance when being used as a food dehydrator.

FIG. 3 is a transverse, vertical sectional view of the appliance when being used as a bread and other bakery products dough raiser.

FIG. 4 is a perspective view of the bread raising shelf and the attached water trough.

DETAILED DESCRIPTION OF PREFERRED EMBODIMENT

Figure 1:
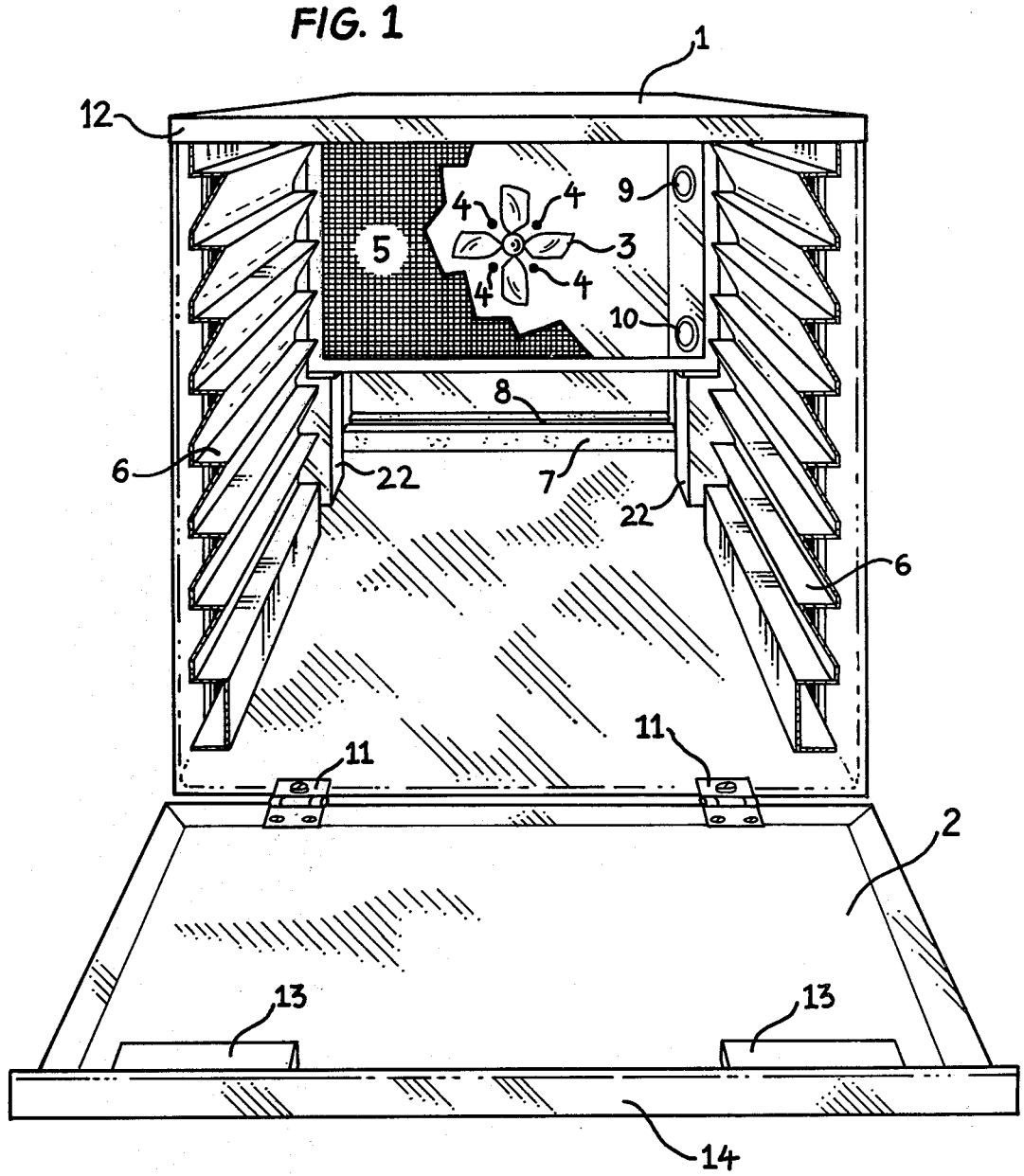
FIG. 1 is a perspective view of the interior of the dehydration chamber as seen from the front with the access door fully opened.

Referring now to the drawings and more particularly to FIGS. 1 and 2, the operation of the combination food dehydrator and dough raiser being used in the dehydrator mode of operation can be shown in detail. The racks 21 have been omitted from the perspective view shown in FIG. 1 so that the fixed volume ventilation features of this invention and the dehydration chamber heater together with the control locations can be satisfactorily shown.

In FIG. 1 it can be seen that the heating element 8 housed in heater housing 7 is located at the rear and at the bottom of the appliance cabinet. Heating element 8 and heater housing 7 are designed to span the width of the interior of the appliance cabinet 1, so that uniform heat is supplied throughout the dehydration chamber. Thermostat control unit 9 is located near the top of cabinet 1 and directly above heating element 8. The sensing unit of the thermostat control unit 9 is located inside the appliance cabinet chamber and the control portions of the thermostat control unit 9 protrude through the appliance cabinet 1 so that the chamber temperature can be controlled from the outside. Diffuser support brackets 22 are provided on each side of the appliance cabinet 1 and are located in front of the heater housing 7 and thermostat control unit 9 as shown in FIG. 2. The diffuser screen 5 is removably attached to each of the diffuser support brackets 22 and is centered in front of fan blades 3.

Fan motor 16 is mounted external to the appliance cabinet and protected by motor casing 15.

When the appliance is being used as a food dehydrator, as shown in FIG. 2, drying racks 21 are inserted as needed into the dehydration chamber and supported by shelf supports 6. By doing so, horizontal air passageways between the drying racks are defined.

With the food to be dehydrated in place on drying racks 21 and access door 2 closed, the proper temperature is selected by use of thermostat control unit 9 and dehydration is commenced by switching the mode selector switch 10 from off to the dehydrate mode.

While in dehydrating operation, as shown in FIG. 2, fan motor 16 is on and fan blades 3 draw influent air through the motor casing intake ports 17 past motor 16 and into the dehydration chamber via chamber intake ports 18. Concurrently with fan motor operation heating element 8, as controlled by thermostat control unit 9, is heating the influent air prior to its passage through diffuser screen 5. The heated air then passes between drying racks 21 and exits through the exhaust ports defined by the front of the appliance cabinet 1 and access door 2.

Definition of the exhaust ports is accomplished by means of hinges 11, hinging access door 2 at a predetermined distance from the front of appliance cabinet 1 and by the magnetic door spacers 13.

The magnetic door spacers 13 serve a dual function in that in addition to holding access door 2 at a predetermined distance from appliance cabinet 1, they hold access door 2 in the upright, closed position by magnetically contacting with the door strike plate 12 of appliance cabinet 1. The very top portion of access door 2 is lipped over and hemmed to define an access door cover lip 14 and serves multiple functions, first as a structural member of access door 2 to increase its rigidity and secondly as a handle for opening and closing access door 2.

In practice it has been found that setting thermostat control unit 9 to control temperatures in the range of 100° F. to 160° F. will be sufficient to optimize the dehydration process for various foodstuffs.

Now referring to FIGS. 3 and 4 the features of the dough raising shelf 19 are shown to advantage. The dough raising shelf 19 is manufactured from materials sufficiently rigid and strong to support several pounds of bread dough. Attached to dough raising shelf 19 is water trough 20. Water trough 20 is sized to completely cover heating element 8 when bread raising shelf 19 is inserted in the bottom shelf supports 6. FIG. 4 shows the notched design of bread raising shelf 19 which facilitates the insertion of water trough 20 past diffuser support brackets 22.

When bread raising shelf 19 is inserted in appliance cabinet 1, as shown to advantage in FIG. 3, water trough 20 is positioned directly above heating element 8. The dough to be raised is then placed upon dough raising shelf 19, access door 2 is closed and the thermostat control unit 9 is set to a temperature of 75° F. to 100° F. To activate the appliance the mode selector switch 10 is placed in the dough raising mode position and thereby activates heating element 8 as controlled by the thermostat control unit 9 without energizing motor 16. In this mode of operation the water in water trough 20 is evaporated to increase the relative humidity within the dehydration chamber while the temperature in the chamber is preferably maintained in the 80° F. to 90° F. range.

Having thus described in detail a preferred design which embodies the concepts and principles of the invention and which accomplishes the various objects, purposes and aims thereof, it is to be appreciated and will be apparent to those skilled in the art that many physical changes could be made in the combination food dehydrator and dough raiser without altering the inventive concepts and principles embodied therein. Hence, it is intended that the scope of this invention be limited only to the extent indicated in the appended claims.

We claim:

1. An apparatus for food dehydration and bakery product dough raising comprising:
    (a) a cabinet defining a dehydration and dough raising chamber;
    (b) a frontal access door defining the front side of said chamber;
    (c) means for attaching said frontal access door to said cabinet at a distance so as to define exhaust vents between said cabinet and said frontal access door;
    (d) the side of said cabinet opposite the frontal access door having a plurality of intake ports;
    (e) a plurality of support shelves attached to the interior side walls of said cabinet in paired relationship for supporting drying racks and a dough raising shelf in a horizontal plane;
    (f) a plurality of drying racks resting upon said support shelves so as to be in vertical spaced relationship to each other so as to define air passageways between said drying racks;
    (g) a dough raising shelf for supporting bakery product dough adaptable for resting upon said support shelves;
    (h) means for increasing the relative humidity within said chamber when used for raising dough;
    (i) a constant speed blower motor and fan mounted upon the rear wall of said cabinet for continuously drawing replacement air from the intake ports, through the chamber and between the drying racks to exit through the exhaust vents when the chamber is used for dehydrating foodstuffs;
    (j) a screen disposed in said cabinet between said fan and drying racks so as to diffuse replacement air uniformly throughout the air passageways defined by the plurality of drying racks;
    (k) means for stopping said distribution of replacement air when raising bakery product doughs;
    (l) heating means disposed within said chamber for elevating the temperature therein; and
    (m) means for regulating the temperature of the air within said chamber adaptable to regulate said temperature within the foodstuff dehydration temperature range of 100° F. to 160° F. and the dough raising temperature range of 75° F. to 100° F.

2. An apparatus for food dehydration and bakery product dough raising comprising:
    (a) a cabinet defining a dehydration and dough raising chamber;
    (b) a frontal access door defining the front side of said chamber;
    (c) means for attaching said frontal access door to said cabinet at a distance so as to define exhaust vents between said cabinet and said frontal access door;
    (d) the side of said cabinet opposite the frontal access door having a plurality of intake ports;
    (e) a plurality of support shelves attached to the interior side walls of said cabinet in paired relationship for supporting drying racks and a dough raising shelf in a horizontal plane;
    (f) a plurality of drying racks resting upon said support shelves so as to be in vertical spaced relationship to each other so as to define air passageways between said drying racks;
    (g) a dough raising shelf for supporting baker product dough adaptable for resting upon said support shelves;
    (h) blower means for continuously distributing replacement air from the intake ports, through the chamber and between the drying racks to exit through the exhaust vents when the chamber is used for dehydrating foodstuffs;
    (i) means for stopping said distribution of replacement air when raising bakery product doughs;
    (j) a resistance heating element having a heater housing and adaptable for positioning upon the bottom of said chamber and adjacent to the side opposite said access door;
    (k) a water trough adaptable for positioning in close spacial relationship above said heating element for increasing the relative humidity within said chamber when used for raising dough;
    (l) means for regulating the temperature of the air within said chamber adaptable to regulate said temperature within the foodstuff dehydration temperature range of 100° F. to 160° F. and the dough raising temperature range of 75° F. to 100° F.

3. The apparatus of claim 2 wherein said water trough is attached to said dough raising shelf and adaptable for positioning above said heating element when said dough raising shelf rests upon the lowermost pair of support shelves.

* * * * *